US009768873B2

(12) United States Patent
Hajimiri et al.

(10) Patent No.: US 9,768,873 B2
(45) Date of Patent: Sep. 19, 2017

(54) AMPLIFICATION-FREE ELECTRO-OPTICAL OSCILLATOR

(71) Applicant: California Institute of Technology, Pasadena, CA (US)

(72) Inventors: Seyed Ali Hajimiri, La Canada, CA (US); Firooz Aflatouni, Philadelphia, PA (US); Behrooz Abiri, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/489,393

(22) Filed: Sep. 17, 2014

(65) Prior Publication Data

US 2015/0104191 A1    Apr. 16, 2015

Related U.S. Application Data

(60) Provisional application No. 61/878,760, filed on Sep. 17, 2013.

(51) Int. Cl.
*H04B 10/50* (2013.01)
*H04B 10/90* (2013.01)

(52) U.S. Cl.
CPC ....... *H04B 10/50577* (2013.01); *H04B 10/50* (2013.01); *H04B 10/90* (2013.01); *H04B 2210/006* (2013.01)

(58) Field of Classification Search
CPC .................................. H04B 10/5057–10/50577
See application file for complete search history.

(56) References Cited

U.S. PATENT DOCUMENTS

| | | | |
|---|---|---|---|
| 6,700,517 B1 | 3/2004 | Kellar | |
| 7,496,298 B2 | 2/2009 | Chen et al. | |
| 2001/0024315 A1* | 9/2001 | Cisternino | H04B 10/505 359/329 |
| 2003/0147116 A1* | 8/2003 | Shpantzer | H04B 10/25137 359/264 |

(Continued)

OTHER PUBLICATIONS

U.S. Appl. No. 14/489,354, Non-Final Office Action mailed Feb. 7, 2017.

(Continued)

*Primary Examiner* — David Payne
*Assistant Examiner* — Casey Kretzer
(74) *Attorney, Agent, or Firm* — Alston & Bird LLP

(57) ABSTRACT

An electro-optical oscillator includes, in part, a modulator, a signal splitter, N photodiodes with N being an integer greater than one, a signal combiner, and a filter. The modulator modulates an optical signal in accordance with a feedback signal. The splitter splits the modulated optical signal into N optical signals each delivered to a different one of N photo-diodes. Each of the N photo-diodes converts the optical signal it receives to a current signal. The signal combiner combines the N current signals received from the N photo-diodes to generate a combined current signal. The filter filters the combined current signal and generates the feedback signal. The electro-optical oscillator optionally includes, in part, N variable optical gain/attenuation components each amplifying/attenuating a different one of the N optical signals generated by the splitter.

10 Claims, 5 Drawing Sheets

(56) References Cited

U.S. PATENT DOCUMENTS

| | | | |
|---|---|---|---|
| 2005/0013612 A1* | 1/2005 | Yap | G02F 2/002 |
| | | | 398/53 |
| 2006/0239695 A1* | 10/2006 | Sayyah | G02F 1/0121 |
| | | | 398/161 |
| 2010/0080570 A1* | 4/2010 | Conroy | H04B 10/5057 |
| | | | 398/154 |
| 2012/0155880 A1* | 6/2012 | Nishimoto | H04B 10/50572 |
| | | | 398/79 |
| 2012/0213531 A1 | 8/2012 | Nazarathy et al. | |
| 2017/0063460 A1 | 3/2017 | Hajimiri et al. | |

OTHER PUBLICATIONS

Yao, et al., "Optoelectronic microwave oscillator," *J. Opt. Soc. Amer. B*, 13(8):1725-1735, (1996).

Aflatouni, et al., "Design Methodology and Architectures to Reduce the Semiconductor Laser Phase Noise Using Electrical Feedforward Schemes," *IEEE Transactions on Microwave Theory and Techniques*, 58(11):3290-3303, (2010).

U.S. Appl. No. 14/489,354, filed Sep. 17, 2014.

* cited by examiner

AMPLIFICATION-FREE ELECTRO-OPTICAL OSCILLATOR

CROSS-REFERENCES TO RELATED APPLICATIONS

The present application claims benefit under 35 USC 119(e) of U.S. provisional application No. 61/878,760, filed Sep. 17, 2013, entitled "AMPLIFICATION-FREE ELECTRO-OPTICAL OSCILLATORS", the content of which is incorporated herein by reference in its entirety. The present application is related to commonly assigned co-pending application Ser. No. 14/489,354, filed Sep. 17, 2014, entitled "OPTICALLY ASSISTED ELECTRICAL FILTERING AND PROCESSING", the content of which is incorporated herein by reference in its entirety.

FIELD OF THE INVENTION

The present invention relates to electro-optical systems, and more particularly to generating an oscillating signal in such systems.

BACKGROUND OF THE INVENTION

Electro-optical oscillators (EOO) have many applications in such areas as optical and wireless communications, radar, RF over fiber, sensing, and imaging. Low phase noise compact mm-wave and sub-mm-wave signal generation is used in portable or non-portable spectroscopy systems, high resolution imaging systems, and small form-factor radars.

FIG. 1 is a simplified block diagram of an electro-optic oscillator 10, as known in the prior art. The optical signal generated by laser 12 is modulated using Mach-Zhender modulator (MZM) 30 to generate modulated signal A_mod. MZM 30 includes a combiner 14 and an optical phase modulator 16. Modulated signal A_mod is delayed using a low-loss optical delay component 16 and converted to an electrical signal I via photo-diode 18. Current signal I is filtered using filter 20, and amplified using amplifier 22 before being fed back to the optical phase modulator 16 disposed in MZM 30.

The noise contribution by different sources in electro-optic oscillator 10 may be modeled as:

$$\overline{i^2_{n,total}} = \overline{i^2_{n,electrical}} + \overline{i^2_{n,laser,RIN}} + \overline{i^2_{n,Photodiode,shot}}$$

where $i_{n,electrical}$, $i_{n,laser,RIN}$, and $i_{n,Photodiode,shot}$ respectively represent the total input referred current noise of the electronic components, the equivalent current noise corresponding to the laser relative intensity noise (RIN), and the photodiode shot noise, respectively. The −3 dB linewidth of the power spectral density of the generated electrical oscillatory voltage may be defined as:

$$C \approx \frac{\overline{i^2_{n,total}}}{2R^2 P_0^2 \tau^2 J_1^2\left(\frac{V_0}{V_\pi}\pi\right)}$$

where $R$, $P_0$, $\tau$, $V_0$, and $V_\pi$ are the photodiode responsivity, the laser power, the delay of the optical delay line, the oscillation amplitude, and the modulator voltage to phase conversion gain, respectively. The term $J(.)$ represents the Bessel function of the first kind

BRIEF SUMMARY OF THE INVENTION

An electro-optical oscillator, in accordance with one embodiment of the present invention, includes, in part, a modulator, a signal splitter, N photodiodes with N being an integer greater than one, a signal combiner, and a filter. The modulator is adapted to modulate an optical signal in accordance with a feedback signal. The splitter is adapted to split the modulated optical signal into N optical signals each delivered to a different one of the N photodiodes. Each of the N photodiodes is adapted to convert the optical signal it receives to a current signal. The signal combiner is adapted to combine the N current signals received from the N photodiodes to generate a combined current signal. The filter is adapted to filter the combined current signal to generate and apply the feedback signal to the modulator.

In one embodiment, the electro-optical oscillator further includes, in part, N variable optical gain/attenuation components each disposed in a different one of N optical paths and adapted to amplify/attenuate the optical signal delivered to that path. Each of the N photodiodes receives an optical signal from a different one of the N optical paths. In one embodiment, the electro-optical oscillator further includes, in part, N variable delay components each disposed in a different one of the N optical paths and adapted to delay the optical signal delivered to that path. In one embodiment, the electro-optical oscillator further includes, in part, a variable delay component disposed between the optical modulator and the splitter and adapted to delay the optical signal delivered to the splitter.

An electro-optical oscillator, in accordance with one embodiment of the present invention, includes, in part, a modulator, a signal splitter, first and second groups of N photodiodes with N being an integer greater than one, a pair of signal combiners, and a pair of filters. The modulator is adapted to generate a pair of modulated differential signals. The splitter is adapted to split the modulated differential signals into a first group of N optical signals and a second group of N optical signals. The splitter delivers each of the first group of N optical signals to a different one of the first group of N photodiodes, and further delivers each of the second group of N optical signals to a different one of the second group of N optical diodes. Each of the N photodiodes of the first and second groups converts the optical signal it receives to a current signal. The first signal combiner combines the N current signals it receives from the first group of N photodiodes to generate a differentially positive signal. The second signal combiner combines the N current signals it receives from the second group of N photodiodes to generate a differentially negative signal. The first filter filters the differentially positive signal to generate a first feedback that the first filter applies to the optical modulator. The second filter filters the differentially negative signal to generate a second feedback that the second filter applies to the optical modulator. The modulator generates the modulated differential signals in accordance with the first and second feedback signals.

In one embodiment, the electro-optical oscillator further includes, in part, a first group of N variable optical gain/attenuation components each disposed in a different one of a first group of N optical paths and each adapted to amplify/attenuate the optical signal delivered to that path. Each of the photodiodes in the first group of N photodiodes receives an optical signal from a different one of the first group of N optical paths. The electro-optical oscillator further includes, in part a second group of N variable optical gain/attenuation components each disposed in a different one of a second group of N optical paths and each adapted to amplify/attenuate the optical signal delivered to that path. Each of the photodiodes in the second group of N photodiodes receives an optical signal from a different one of the second group of N optical paths.

In one embodiment, the electro-optical oscillator further includes, in part, a first group of N variable delay components each disposed in a different one of the first group of N optical paths and each adapted to delay the optical signal delivered to that path. The electro-optical oscillator further includes, in part, a second group of N variable delay components each disposed in a different one of the second group of N optical paths and each adapted to delay the optical signal delivered to that path. In one embodiment, the electro-optical oscillator further includes, in part, a variable delay component disposed between the modulator and the splitter and adapted to delay the optical signal delivered to the splitter.

DETAILED DESCRIPTION

An electro-optical oscillator, in accordance with one embodiment of the present invention, has a substantially reduced phase noise. The electro-optical oscillator dispenses the need for such operations as electrical amplification, thereby achieving a phase noise that is generally independent of the oscillation frequency. The substantially lower phase noise of an electro-optical oscillator, in accordance with embodiments of the present invention, makes it suitable for use in applications operating in mm-wave and THz frequency ranges.

Figure 2:
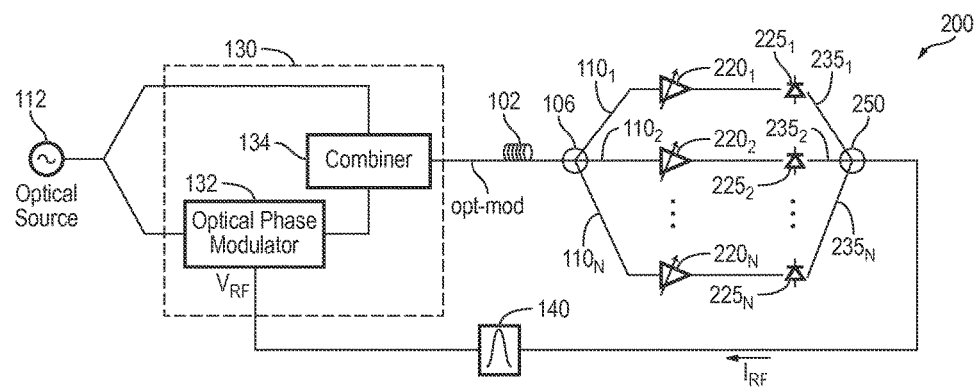
FIG. 2 is a block diagram of an electro-optic oscillator, in accordance with one embodiment of the present invention.

FIG. 2 is a simplified block diagram of an electro-optic oscillator 200, in accordance with one embodiment of the present invention. Electro-optic oscillator 100 is shown as including, in part, a modulator 130, a variable delay component 102, a filter 140, a multitude of variable gain/attenuation components $220_1, 220_2 \ldots 220_N$, and a multitude of photodiodes $225_1, 225_2 \ldots 225_N$.

The optical signal generated by optical signal source (e.g., a laser) 112 is modulated by optical modulator 130 shown as having disposed therein an optical phase modulator 132 and a combiner 134. The modulated optical signal opt_mod is delayed by optical delay component 102 and split by optical signal splitter 106 into N optical signals each delivered to a different one of N optical paths $110_1, 110_2 \ldots 110_{N-1}, 110_N$—collectively and alternatively referred to herein as optical paths 110. Disposed in each optical path $110_i$, where i is an integer ranging from 1 to N, is a variable gain/attenuation component $220_i$ adapted to amplify the optical signal it receives and deliver the amplified/attenuated optical signal to an associated photo-diode 120, disposed in that path.

Figure 1:
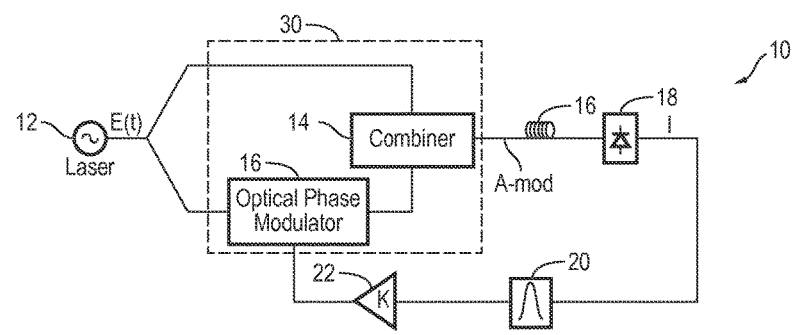
FIG. 1 is a block diagram of an electro-optic oscillator, as known in the prior art.

In the following, for simplicity, the same reference number may be used to identify both the path through which a signal travels, as well as to the signal which travels through that path. For example, reference numeral $110_1$ may be used to refer to the path so identified in FIG. 1, or alternatively to the signal that travels through this path. Furthermore, in the following, the terms divider, splitter, coupler, or combiner are alternatively used to refer to an element adapted to split/divide a signal to generate more signals and/or couple/combine a multitude of signals to generate one or more signals. Such a component is also alternatively referred to herein as splitter/coupler. Furthermore, although the embodiments of the present invention are described with reference to photodiodes, it is understood that any device that converts an optical signal to an electrical signal may also be used; accordingly, all such devices are referred to herein as photodiodes.

As described above, each variable gain/attenuation component $220_i$ is adapted to vary the gain/attenuation value of the optical signal it receives and deliver the amplified/attenuated signal to an associated photodiode $225_i$. Each photo-diode $225_i$ is adapted to convert the optical signal it receives from its associated variable gain/attenuation component $220_i$ to an electrical current signal $235_i$. Combiner 250 is adapted to receive and combine currents $235_i$ to generate a current signal $I_{RF}$ that is delivered to filter 140. Filter 140 converts current $I_{RF}$ to a voltage signals and filters out the undesirable frequency components of the signal to generate voltage signal $V_{RF}$ applied to optical phase modulator 132.

Because, in accordance with the present invention, electro-optic oscillator 200 splits the modulated signal opt_mod into a multitude of optical signals $110_i$ each of which is amplified by an optical amplifier $220_i$ and subsequently converted to an electrical signal via an associated photodiode $225_i$, the phase-noise or linewidth of the oscillator has a substantially reduced dependence on the oscillation frequency. For example, assuming that the modulator and photodiodes operate at 80 GHz, and the relative noise intensity of the laser 112 is −140 dB/Hz, a phase noise better than −140 dBc/Hz at 1 MHz offset (at 80 GHz) may be achieved. Furthermore, because in accordance with the present invention electro-optic oscillator 100 uses a multitude of photodiodes $225_i$ to generate current $I_{RF}$, the overall gain of electro-optic oscillator 200 may be equal to or higher than those of the conventional electro-optic oscillators using electrical signal amplification.

Figure 3:
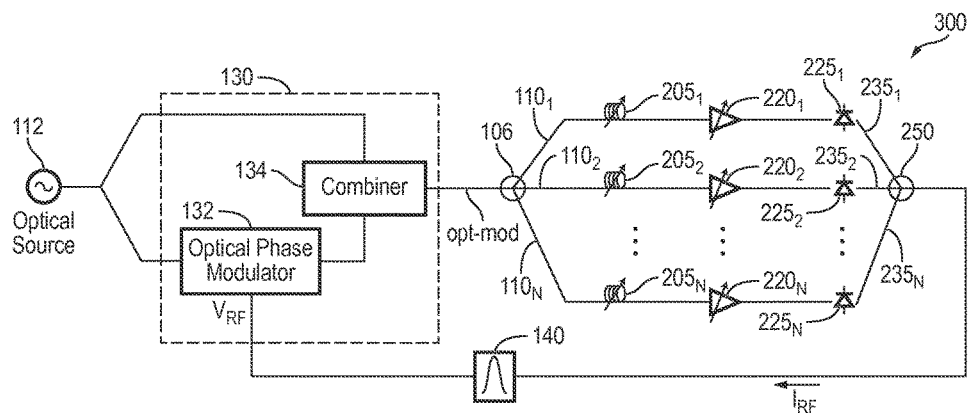
FIG. 3 is a block diagram of an electro-optic oscillator, in accordance with one embodiment of the present invention.

FIG. 3 is a simplified block diagram of an electro-optic oscillator 300, in accordance with another embodiment of the present invention. Electro-optic oscillator 300 is similar to electro-optic oscillator 200 except that electro-optic oscillator 300 includes an optical delay component $205_i$ in each of its optical paths $110_i$. Each optical delay component $205_i$ is adapted to delay the optical signal it receives and deliver the delayed optical signal to an associated variable gain/attenuation component $220_i$.

Figure 4:
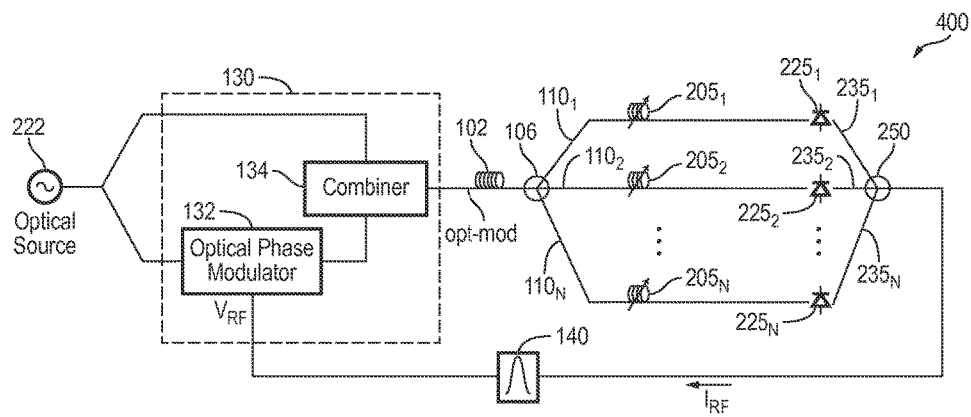
FIG. 4 is a block diagram of an electro-optic oscillator, in accordance with one embodiment of the present invention.

FIG. 4 is a simplified block diagram of an electro-optic oscillator 400, in accordance with another embodiment of the present invention. Electro-optic oscillator 400 is similar to electro-optic oscillator 300 except that electro-optic oscillator 400 does not include variable gain/attenuation components in its optical paths $110_i$. To achieve the desired level of power and compensate for the lack of gain/attenuation components, electro-optic oscillator 400 uses a laser 222 having a power that is higher than the power of the lasers used in embodiments 200 and 300. For example, the lasers used in embodiments 200 and 300 may have a power of 10 mW. The laser used in embodiments 400 may have a power of 800 mW. Electro-optic oscillator 400 is also shown as including a main variable delay components 102 disposed between optical splitter 106 and optical modulator 130.

Figure 5:
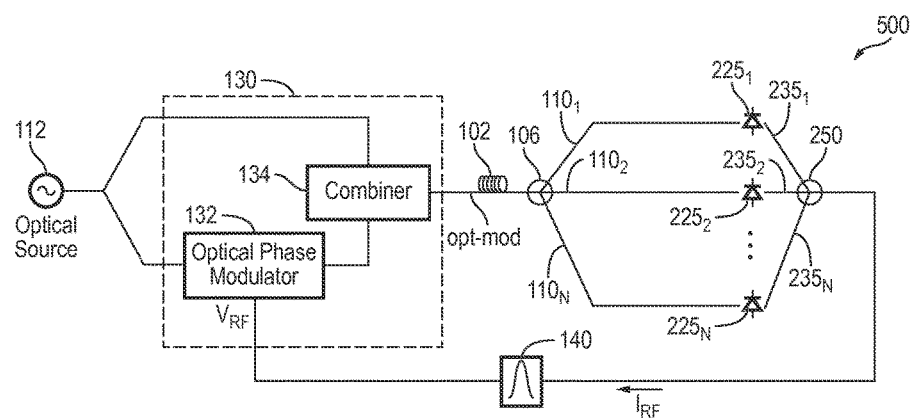
FIG. 5 is a block diagram of an electro-optic oscillator, in accordance with one embodiment of the present invention.

FIG. 5 is a simplified block diagram of an electro-optic oscillator 500, in accordance with yet another embodiment of the present invention. Electro-optic oscillator 500 is similar to electro-optic oscillator 400 except that electro-optic oscillator 500 does not include any optical delay component $205_i$ in its optical paths $110_1$. To achieve the desired level of power, electro-optic oscillator 300 uses a laser 222 having a power that is higher than the power of the lasers used, for example, in embodiment 300. For example, the lasers used in embodiments 500 may have a power of 800 mW.

Figure 6:
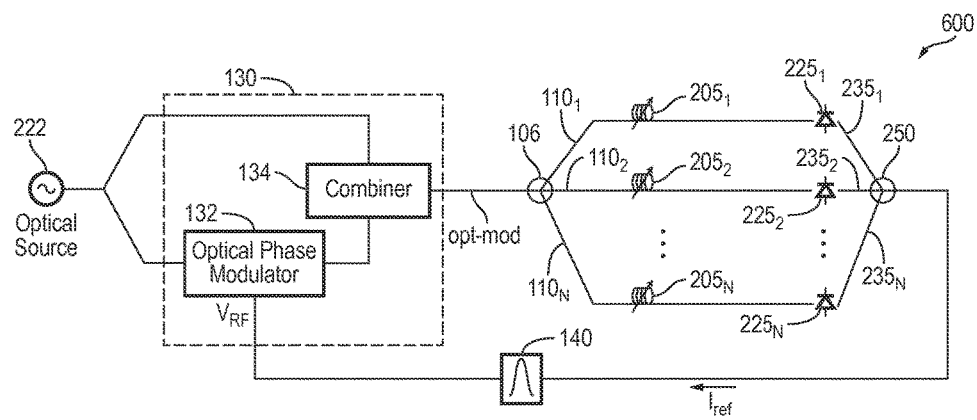
FIG. 6 is a block diagram of an electro-optic oscillator, in accordance with one embodiment of the present invention.

FIG. 6 is a simplified block diagram of an electro-optic oscillator 600, in accordance with yet another embodiment of the present invention. Electro-optic oscillator 600 is similar to electro-optic oscillator 400 except that electro-optic oscillator 600 does not include main optical delay components 102 of embodiment 400.

Figure 7:
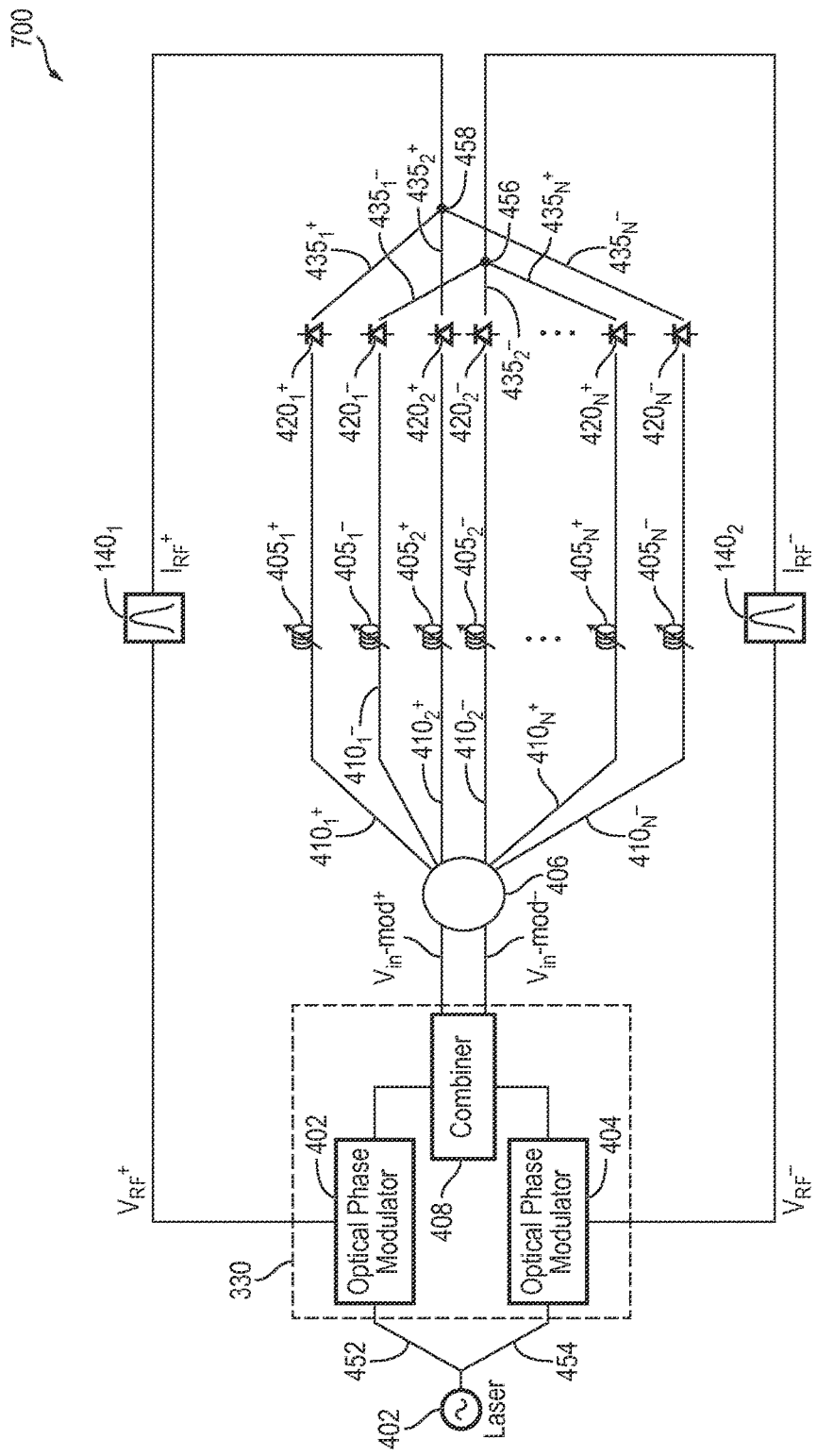
FIG. 7 is a block diagram of an electro-optic oscillator, in accordance with one embodiment of the present invention.

FIG. 7 is a simplified block diagram of an electro-optic oscillator 700, in accordance with another embodiment of the present invention. Electro-optic oscillator 700 generates an oscillating signal differentially, as described further below. The optical signal generated by optical source 402, which may be a laser, is split into a pair of optical signals 452 and 454 that are respectively delivered to optical phase modulators 402 and 404. Optical phase modulators 402, 404 together with combiner 408 form an optical modulator 330. As described further below, differential feedback voltages $V_{RF}^+$, $V_{RF}^-$ are used to modulate optical signals 452 and 454 using optical phase modulators 402 and 404, respectively. The modulated optical signals are received by combiner 408 which in response delivers the optically modulated signals $V_{in\_}\text{mod}^+$ and $V_{in\_}\text{mod}^-$ to signal splitter 406. Signal splitter 406 splits each of the differential signals $V_{in\_}\text{mod}^+$ and $V_{in\_}\text{mod}^-$ into N signals, where N is an integer greater than one. Accordingly, as shown, signal $V_{in\_}\text{mod}^+$ is split into N signals $410_1^+, 410_2^+ \ldots 410_N^+$, representing differentially positive signals. Likewise, signal $V_{in\_}\text{mod}^-$ is split into N signals $410_1^-, 410_2^- \ldots 410_N^-$, representing differentially negative signals.

Each of the 2N optical paths is shown as including a variable delay component $405_i$. For example, path $410_1^+$ is shown as including a variable delay component $405_1^+$ and path $410_1^-$ is shown as including a variable delay component $405_1^-$. Likewise, path $410_N^+$ is shown as including a variable delay component $405_N^+$ and path $410_N^-$ is shown as including a variable delay component $405_N^-$. Each optical delay component $405_i^+$ is adapted to delay the optical signal $410_i^+$ it receives in accordance with the delay value selected for optical delay component $405_i^+$. Likewise, each optical delay component $405_i^-$ is adapted to delay the optical signal $410_i^-$ it receives in accordance with the delay value selected for optical delay component $405_i^-$.

The optically delayed signal in each path $410_i^+/410_i^-$ is received by an associated photo-diode $420_i^+/420_i^-$ adapted to convert the received optical signal to an electrical signal $435_i^+/435_i^-$. For example, photo-diode $420_1^+$ converts the optical signal it receives from variable delay component $405_1^+$ to an electrical signal $435_1^+$. Likewise, for example, photo-diode $420_1^-$ converts the optical signal it receives from variable delay component $405_1^-$ to an electrical signal $435_1^-$. Signal combiner/coupler 458 is adapted to combine the differentially positive current signals $435_1^+, 435_2^+ \ldots 435_N^+$ generated respectively by photo-diodes $420_1^+, 420_2^+ \ldots 420_N^+$ to generate differentially positive current signal $I_{RF}^+$. In a similar manner, signal combiner/coupler 456 is adapted to combine the differentially negative current signals $435_1^-, 435_2^- \ldots 435_N^-$ generated by photo-diodes $420_1^-, 420_2^- \ldots 420_N^-$ to generate differentially negative current signal $I_{RF}^-$.

Filter $140_1$ is adapted to convert current $I_{RF}^+$ to a voltage signal and filter out the undesirable frequency components of the signal to generate voltage signal $V_{RF}^+$ applied to optical phase modulator 402. Likewise, filter $140_2$ is adapted to convert current $I_{RF}^-$ to a voltage signal and filter out the undesirable frequency components of the signal to generate voltage signal $V_{RF}^-$ applied to optical phase modulator 402. The optical delay components $405_i^+$ and $405_i^-$ disposed in paths $410_i^+$ and $410_i^-$ form a finite impulse response (FIR) filter thereby relaxing the characteristics that would be otherwise required from filters $140_1$ and $140_2$.

Figure 8:
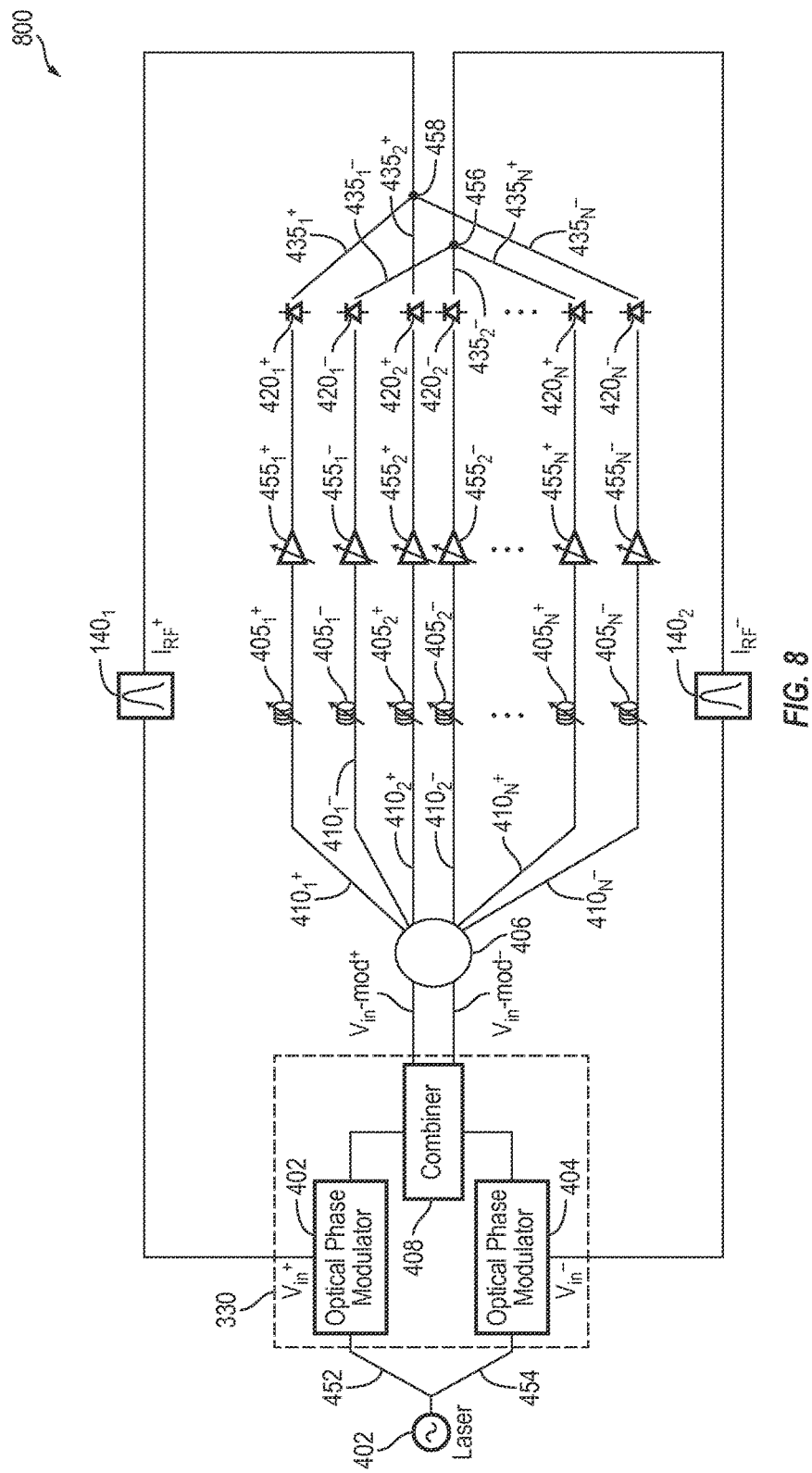
FIG. 8 is a block diagram of an electro-optic oscillator, in accordance with one embodiment of the present invention.

FIG. 8 is a simplified block diagram of an electro-optic oscillator 800, in accordance with another embodiment of the present invention. The optical signal generated by optical source 402, which may be a laser, is split into a pair of optical signals 452 and 454 that are respectively delivered to optical phase modulators 402 and 404. Differential feedback voltages $V_{RF}^+$, $V_{RF}^-$ are used to modulate optical signals 452 and 454 using optical phase modulators 402 and 404, respectively. Optical phase modulators 402, 404 together with combiner 408 form an optical modulator 330. The modulated optical signals are received by combiner 408 which in response delivers the optically modulated signals $V_{in\_}\text{mod}^+$ and $V_{in\_}\text{mod}^-$ to signal splitter 406. Signal splitter 406 splits each of the differential signals $V_{in\_}\text{mod}^+$ and $V_{in\_}\text{mod}^-$ into N signals, where N is an integer greater than one. Accordingly, as shown, signal $V_{in\_}\text{mod}^+$ is split into N signals $410_1^+, 410_2^+ \ldots 410_N^+$, representing differentially positive signals. Likewise, signal $V_{in\_}\text{mod}^-$ is split into N signals $410_1^-, 410_2^- \ldots 410_N^-$, representing differentially negative signals.

Each of the 2N optical paths is shown as including a variable delay component $405_i$ and a variable gain/attenuator $455_i$. For example, path $410_1^+$ is shown as including a variable delay component $405_1^+$ and a variable gain/attenuator $455_1^+$; path $410_1^-$ is shown as including a variable delay component $405_1^-$ and a variable gain/attenuator $455_1^-$. Likewise, path $410_N^+$ is shown as including a variable delay component $405_N^+$ and a variable gain/attenuator $455_N^+$; and path $410_N^-$ is shown as including a variable delay component $405_N^-$ and a variable gain/attenuator $455_N^-$.

Each optical delay component $405_i^+$ is adapted to delay the optical signal $410_i^+$ it receives in accordance with the delay value selected for optical delay component $405_i^+$. Likewise, each optical delay component $405_i^-$ is adapted to delay the optical signal $410_i^-$ it receives in accordance with the delay value selected for optical delay component $405_i^-$. Each variable gain/attenuator $455_i^+$ is adapted to vary the gain or attenuation level of the optical signal it receives from its associated optical delay component $405_i^+$ in accordance with the gain/attenuation value selected for the gain/attenuation component $455_i^+$. Similarly, each variable gain/attenuator $455_i^-$ is adapted to vary the gain or attenuation level of the optical signal it receives from its associated optical delay component $405_i^-$ in accordance with the gain/attenuation value selected for the gain/attenuation component $455_i^-$. For example, optical delay component $405_i^+$ delays optical signal $410_i^+$ in accordance with its selected delay. Likewise, variable gain/attenuator $455_1^+$ is adapted to vary the gain/attenuation level of the optical signal it receives from optical delay component $405_1^+$ in accordance with the gain or attenuation value selected for amplifier/attenuator $455_1^+$.

The optically delayed and amplified/attenuated signal in each path $410_i^+/410_i^-$ is received by an associated photo-diode $420_i^+/420_i^-$ adapted to convert the received optical signal to an electrical signal $435_i^+/435_i^-$. For example, photo-diode $420_1^+$ converts the optical signal it receives from variable gain/attenuator $455_1^+$ to an electrical signal $435_1^+$. Likewise, for example, photo-diode $420_1^-$ converts the optical signal it receives from variable gain/attenuator $455_1^-$ to an electrical signal $435_1^-$. Signal combiner/coupler 458 is adapted to combine the differentially positive current signals $435_1^+, 435_2^+ \ldots 435_N^+$ generated respectively by photo-diodes $420_1^+, 420_2^+ \ldots 420_N^+$ to generate differentially positive current signal $I_{RF}^+$. In a similar manner, signal combiner/coupler 456 is adapted to combine the differentially negative current signals $435_1^-, 435_2^- \ldots 435_N^-$ generated by photo-diodes $420_1^-, 420_2^- \ldots 420_N^-$ to generate differentially negative current signal $I_{RF}^-$.

The optical delay components $405_i^+/405_i^-$ and gain/attenuators $455_i^+/455_i^-$ disposed in paths $410_i^+$ and $410_i^-$ form a finite impulse response (FIR) filter thereby relaxing the characteristics that would be otherwise required from filters $140_1$ and $140_2$. In one example, FIR filtering may be achieved by setting $\tau_k = \tau_1 + k\Delta\tau$, where $\Delta\tau$ defines the bandpass filter center frequency and N, which is the number of parallel optical paths, N, defines the order of the filter.

The above embodiments of the present invention are illustrative and not limitative. The invention is not limited by the type of optical phase modulator, signal splitter, signal combiner, optical delay component, optical gain attenuator, or photo-diode. The invention is not limited by the frequency or bandwidth of the optical signal modulated by the electrical signal. The invention is not limited by the number of paths into which the optical signal is split. The invention is not limited by the type of integrated circuit in which the present invention may be disposed. Nor is the invention limited to any specific type of process technology, e.g., CMOS, Bipolar, or BICMOS that may be used to manufacture the embodiments of the present invention. Other additions, subtractions or modifications are obvious in view of the present invention and are intended to fall within the scope of the appended claims.

What is claimed is:

1. An electro-optical oscillator comprising:
   an optical modulator adapted to generate a pair of modulated differential optical signals from a received optical signal;
   a splitter adapted to split the modulated differential optical signals into a first N differential optical signals and a second N differential optical signals, the splitter delivering each of the first N optical signals to a different one of first N optical paths, and delivering each of the second N optical signals to a different one of second N optical paths, N being an integer greater than one;
   a first N photo-diodes each adapted to convert a different one of the first N optical signals to a current signal;
   a second N photo-diodes each adapted to convert a different one of the second N optical signals to a current signal;
   a first signal combiner adapted to combine the N current signals received from the first N photo-diodes to generate a differentially positive signal;
   a second signal combiner adapted to combine the N current signals received from the second N photo-diodes to generate a differentially negative signal;
   a first filter adapted to filter the differentially positive signal to generate a first feedback signal; said first filter adapted to apply the first feedback signal to the optical modulator; and
   a second filter adapted to filter the differentially negative signal to generate a second feedback signal; said second filter adapted to apply the second feedback signal to the optical modulator.

2. The electro-optical oscillator of claim 1 further comprising:
   first N variable optical gain/attenuation components each disposed in a different one of the first N optical paths and adapted to amplify/attenuate the optical signal delivered to the path; and
   second N variable optical gain/attenuation components each disposed in a different one of the second N optical paths and adapted to amplify/attenuate the optical signal delivered to the path.

3. The electro-optical oscillator of claim 2 further comprising:
   first N variable delay components each disposed in a different one of the first N optical paths and adapted to delay the optical signal delivered to the path; and
   second N variable delay components each disposed in a different one of the second N optical paths and adapted to delay the optical signal delivered to the path.

4. The electro-optical oscillator of claim 1 further comprising:
   first N variable delay components each disposed in a different one of the first N optical paths and adapted to delay the optical signal delivered to the path; and
   second N variable delay components each disposed in a different one of the second N optical paths and adapted to delay the optical signal delivered to the path.

5. The electro-optical oscillator of claim 1 further comprising:
   at least one variable delay component disposed between the optical modulator and the splitter and adapted to delay the optical signal delivered to the splitter.

6. A method of generating an oscillating signal, the method comprising:
   modulating an optical signal to generating a pair of modulated differential signals;
   splitting a first one of the pair of modulated differential signals into a first N differential optical signals each delivered to a different one of first N optical paths;
   splitting a second one of the pair of modulated differential signals into a second N differential optical signals each delivered to a different one of second N optical paths;
   converting the optical signal delivered to each of the first N optical paths to generate a first N current signals;
   converting the optical signal delivered to each of the second N optical paths to generate a second N current signals;
   combining the first N current signals to generate a differentially positive current signal;
   combining the second N current signals to generate a differentially negative current signal;
   filtering the differentially positive current signal to generate a first feedback signal;
   filtering the differentially negative current signal to generate a second feedback signal;

modulating the optical signal in accordance with the first feedback signal to generate the first one of the pair of modulated differential signals; and modulating the optical signal in accordance with the second feedback signal to generate the second one of the pair of modulated differential signals.

7. The method of claim 6 further comprising:

amplifying/attenuating the optical signal delivered to each of the first and second N optical paths.

8. The method of claim 7 further comprising:

delaying the optical signal delivered to each of the first and second N optical paths.

9. The method of claim 6 further comprising:

delaying the optical signal delivered to each of the first and second N optical paths.

10. The method of claim 6 further comprising:

delaying the pair of modulated differential signals prior to splitting the pair of modulated differential signals.

\* \* \* \* \*